Oct. 28, 1941.   H. W. ZIMMERMAN   2,260,358
TORQUE MEASURING WRENCH
Original Filed March 6, 1937
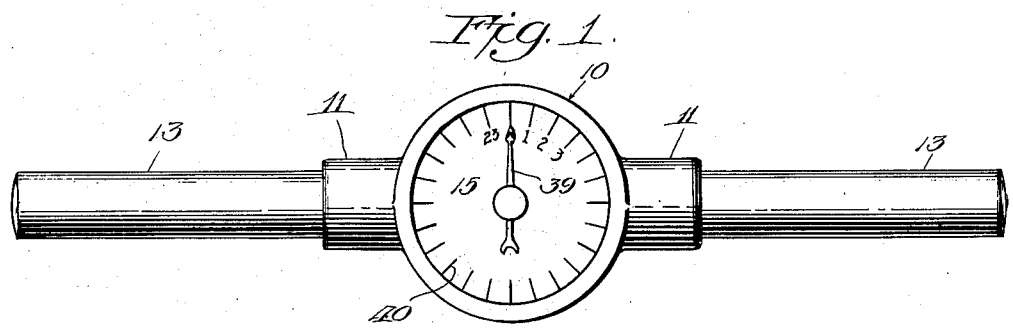
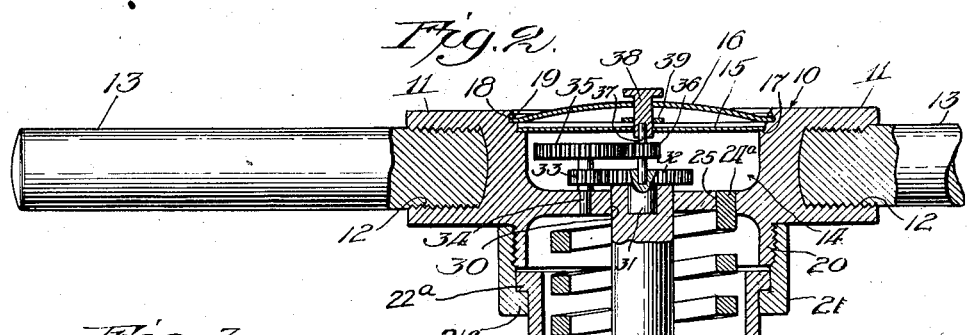
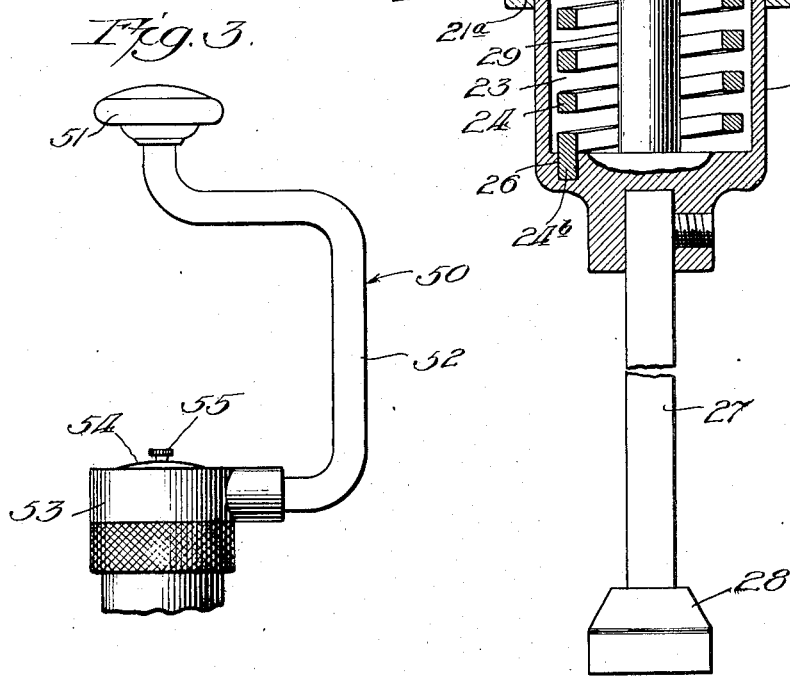
Inventor:
Herman W. Zimmerman
by Davis, Lindsey, Smith & Shonts
Attys.

Patented Oct. 28, 1941

2,260,358

UNITED STATES PATENT OFFICE 2,260,358

TORQUE MEASURING WRENCH

Herman W. Zimmerman, Highland Park, Ill., assignor to Automotive Maintenance Machinery Co., North Chicago, Ill., a corporation of Illinois Original application March 6, 1937, Serial No. 129,357. Divided and this application February 23, 1939, Serial No. 257,848

5 Claims. (Cl. 265—1)

My invention relates to wrenches, and has to do particularly with wrenches adapted for measuring the force or torque applied therethrough in tightening, loosening or otherwise moving nuts, bolts, studs and other devices, as set forth in my copending application Serial No. 129,357, filed March 6, 1937, issued as Letters Patent No. 2,151,953, of which this application is a division.

As is well known, the application of excessive pressure to nuts, bolts, studs, etc., in tightening the same will tend to break or twist off, or otherwise distort, the bolt or stud. The amount of force or pressure that may be applied through a wrench in such cases is determined, in part, by the tensile strength of the bolt or stud material and also somewhat by the depth and pitch of the threads thereof. It is, therefore, desirable that some means be provided for indicating the amount of force or torque applied through the wrench in order that the foregoing objectionable condition may be avoided.

Also, it is quite desirable, in many cases where a plurality of studs or bolts are employed in fastening a device, that all of the studs or bolts be tightened in a uniform manner to insure proper functioning of the device. One example of this is the cylinder head of an automotive engine, in which case it has been found that the lack of uniformity in tightening the cylinder head studs results in distortion of the head, which lowers the efficiency of the engine.

Still further, it has been found expedient, in many cases where parts are rotatably fitted together, to determine the nature of the fit between the parts by measuring the initial force or torque required to relatively rotate such parts. One example of this is the fitting of a bearing, such as a crank shaft bearing. Another example is the fitting of a piston pin, wherein it is desirable to fit the parts in such a way that the resistance to relative movement does not exceed a predetermined extent. An additional example is the fitting of a lathe spindle to its supporting bearings.

One of the objects of my invention is to provide an improved wrench device that serves the foregoing purposes and by which nuts, bolts, studs and the like may be readily tightened to a predetermined extent and any number of them may be set up successively in a uniform manner.

Another object is to provide a torque measuring device which is capable, through the provision of suitable adapter devices, for the measuring of the force or torque required to move various rotatably mounted devices, such, for example, as crank shafts, lathe spindles, piston and connecting rod mountings, and the like.

A further object is to provide a torque measuring device of the foregoing character which is quite simple in construction and embodies but very few parts that may be readily and easily assembled and disassembled, is so inexpensive that it may readily find its way into automotive and other service stations and work shops of practically all classes, is substantially foolproof in operation, and is adapted to serve the intended purpose in a highly efficient manner at all times.

Further objects and advantages will become apparent as this description progresses, and by reference to the drawing wherein—

Figure 1 is a top plan view of one form of wrench embodying my invention;

Fig. 2 is an enlarged, vertical sectional view of the structure shown in Fig. 1; and Fig. 3 is a partial side elevational view of a torque measuring wrench of the character shown in Fig. 2, except that a modified form of handle is employed.

The wrench shown in Figs. 1 and 2 includes a body 10 having oppositely extending arms 11, each of which is provided with a threaded opening 12 adapted to receive the threaded end of a handle member 13. The central portion of the body 10 is provided with an open top, annular chamber 14, the upper portion of which is covered by a circular dial member 15 which, in turn, is covered by a transparent, circular cover 16. The peripheral edge of the dial member 15 is seated upon a shoulder 17 at the upper end of the chamber 14 and the peripheral edge of the cover 16 is received in an annular groove 18 above the shoulder 17, the cover being confined therein by a snap ring 19 of any suitable and well-known form. The chamber 14 receives gage-operating mechanism which will be described in detail hereinafter.

The lower side of the body is provided with a continuous, depending annular flange 20 which is exteriorly threaded to receive a retaining ring 21 that rotatably supports and connects a cup-shaped, shell-like member 22 to the body 10. To this end, the lower end of the ring 21 is provided with an inwardly extending flange 21ª, and the upper end of the cup-shaped member 22 is provided with an outwardly extending flange 22ª, which flanges abut each other as shown in Fig. 2, thereby preventing axial separation of the member 22 from the ring 21 and body 10 while permitting relative rotation between these parts. The member 22, ring 21 and flange 20, when assembled, constitute, in effect, a pair of relatively rotatable shell members rotatable together and relatively about a common axis, which members define a space 23 in which is received a torsion spring 24. The upper end 24ª of the torsion spring is turned lengthwise of the spring to engage an opening 25 formed in the adjacent wall of the wrench body 10; and the lower end 24ᵇ of the torsion spring is turned likewise to engage an opening 26 in the end wall of the member 22. It will, therefore, be clear that, with this arrangement relative rotation between the member 22 and the body 10 (including ring 21 and flange 20) is yieldably opposed by the spring 24.

The lower end of the member 22 non-rotatably receives the upper end of a shank 27 carrying an adapter device 28 which may take the form of a socket member or other suitable means for engaging the work. The member 22 is further provided internally with an integral, axial, shaft-like extension 29 which projects toward the body 10 and is rotatably received in an opening 30 in the lower side of the wrench body, which extension serves as a guide bearing, so to speak, for rotation of the member 22.

The gage operating mechanism is directly connected to the shaft-like extension 29. More particularly, the body-engaged end of the shaft 29 is provided with an opening which fixedly receives the hub 31 of a comparatively large gear 32, which, in turn, meshes with a smaller gear 33 carried by a shaft 34 rotatably supported by the body 10 at the bottom of the chamber 14. The shaft 34 further supports, above the gear 33, another and larger gear 35 which, in turn, meshes with a smaller gear 36 carried by a shaft 37 which is rotatably supported by and axially of the gear 32. The shaft 37 projects toward the dial 15, where it is frictionally received in an opening provided in the inner end of a gage hand carrying member 38 which projects outwardly through the dial 15 and the cover 16. The member 38 fixedly supports a gage hand 39, and it is movable relative to the dial 15, which is provided with a scale 40 adapted to register the extent of relative rotation between the member 22 and body 10 and the extent of wind-up of the torsion spring 24, preferably, in terms of inch-pounds pressure, each graduation of the scale 40 indicating, for example, 100 inch-pounds pressure. In order that the gage hand 39 may always be properly set to register the pressure with respect to the zero mark on the scale 40, the fit between the member 38 and the shaft 37 is such that when the member 28 is applied to the work and held stationary thereby, the outer end of the member 38 may be grasped and rotated relative to the shaft 37 to move the hand 39 to the zero position on the scale 40.

The spring 24 is so constructed that a predetermined initial force or torque is required to overcome its initial tension and permit relative rotation of the member 22 and the body 10. It will be obvious that, with the member 28 applied to the work, and the handle 13 is rotated in clockwise direction (as viewed in Fig. 1), as soon as the work offers sufficient resistance to overcome the initial tension of the spring 24, the member 22 and body 10 will rotate relatively, the extent of this rotation, and also the extent of increased tension of the spring, being registered on the gage dial by movement of the hand 39 in terms of inch-pounds pressure.

In the operation of the gage structure, relative rotation between the member 22 and the body 10 causes relative rotation of the shaft-like extension and gear 32 relative to the gear 33, thereby rotating the gears 33 and 35 and, in turn, the gear 36 and the gage hand 39. It will be appreciated that the relative rotation of the wrench parts may be of slight extent and, to facilitate accurate determination of the force or torque condition, under such conditions, the relative sizes of the gears 32 and 33 and the gears 35 and 36 are such that a very slight relative movement of the wrench parts results in a greatly amplified movement of the gage hand 39.

Various forms of handle devices may be employed when the wrench is applied to the work. For example, in Fig. 3 I show a handle arrangement of such character that the wrench may be held in engagement with the work with one hand and rotated with the other. Specifically, the wrench is provided with a handle 50 having a knob 51 upon which the hand of an operator may be placed for holding the wrench engaged with the work. It is also provided with an offset U-shaped hand grip portion 52 which may be grasped by the other hand of the operator for rotating the wrench structure, the knob 51 being rotatable upon the hand grip portion 52 to permit of this action, as will be well understood. The remainder of the structure of this wrench may take the same form as the structure shown in Fig. 2. In that case, the wrench body 53 is provided in its upper surface with a gage structure including a dial and pointer similar to the dial 15 and pointer hand 39 of the previously described form. The gage structure further includes a transparent cover 54 similar to the cover 16 of Fig. 2 and an accessible finger-piece 55 similar to the member 38, above described. In this structure, the knob 51 is located above and in substantially axial alignment with the gage structure so that the operator may readily look down upon and observe the gage structure in the use of the wrench.

It is believed that the operation and advantages of my invention will be readily understood from the foregoing description. The device may be easily and quickly applied to the work and it may be rotated through the handle devices disclosed. As the wrench is rotated, and as soon as the initial tension of the torsion spring is overcome, the relatively rotatable wrench parts will rotate relatively, and this will cause actuation of the gage mechanism. The gage mechanism and the relatively rotatable parts are so arranged that the extent of relative movement of the wrench parts as indicated by the gage mechanism accurately determines the extent of pressure applied to the work.

I claim:

1. In a structure of the class described, a pair of shell members adapted for rotation together and relatively about a common axis, a coupling member rigidly secured to one of said relatively rotatable members and rotatably interlocked with the other of said rotatable members for coupling said rotatable members for relative rotation, spring means between and enclosed by said shell members and connected at its ends to said members in such a way as to yieldingly oppose relative rotational movement thereof, handle means on one of said members, work-engaging means on the other of said members, and indicating means including a first part carried by one of said members and rotatable relative to both said members and coaxial therewith for indicating extent of movement of said members, a second part carried by the other of said members, and a motion-transmitting part between said first and second parts.

2. In structure of the class described, a body member, a shell-like member rotatably carried by said body member and defining with said body member a spring chamber, a pair of opposed handles carried by one of said members, means on the other of said members for engaging the same with the work, a torsion spring in said chamber fastened at one end direct to said body member and at its other end direct to said shell-like member and yieldably opposing relative rotation of said members, axially disposed, rotary guide means rigidly carried by one of said members and rotatably engaged with the other of said members, an indicator device carried by and rotatable relative to said body member, gear means between said rotary guide means and said indicator device and adapted to apply rotational movement to said indicator in an amplified manner upon relative rotation of said members, the arrangement being such that the force or torque applied to the wrench is applied through said spring, and means associated with said indicator registering the extent of relative rotation of said members in terms of pressure units.

3. In structure of the class described, a body member, a shell-like member rotatably carried by said body member and defining with said body member a spring chamber, handle means carried by one of said members, means on the other of said members for engaging the same with the work, a torsion spring in said chamber connected at one end to said body member and at its other end to said shell-like member and yieldably opposing relative rotation of said members, an axial shaft element on said shell-like member extending toward said body member and rotatably engaged with the latter, and means for indicating the extent of relative movement between said members as opposed by said spring, including a gear carried by and rotatable with said shaft element, another gear rotatably carried by said body member, an indicator device rotatable relative to said body member, movement amplifying connections between said gears and said indicator device, and a member calibrated in terms of pressure units carried by said body member and with respect to which said indicator device is rotatable.

4. A torque measuring wrench comprising a body member, handle means on said body member, a second member, means secured to both of said members for rotatably connecting said second member to said body member for rotation therewith and relatively thereto about a common axis, a torsion spring concealed within and coaxial with said members and having end portions connected thereto to yieldably oppose relative rotation thereof, means coaxial with said second member for connecting it with the work, means coaxial with said second member and rotatably engaged with said body member for maintaining a fixed coaxial relationship between said members, and indicating means associated with said members and actuated by relative movement thereof for measuring the pressure applied through the wrench to the work.

5. A torque registering wrench having in combination a shaft, a socket-bearing member fixed to one end of the shaft, an index operatively connected to and extending laterally of the other end of the shaft, a rotatable handle member mounted on the said other end of the shaft in axially spaced relation to the said socket-bearing member and inwardly of the said index, an elastic torque-transmitting helical spring coupling the handle member with the socket-bearing member and encircling the shaft between confronting end portions of the said members to hold the latter in axially spaced relation, a laterally extending scale fixed to the handle member in cooperative relation with the said index, and a cylindrical housing fixed at one end to the socket-bearing member and extending outwardly around the spring and the shaft with its free end in abutment with the rotatable handle member to provide a thrust bearing support for the latter.

HERMAN W. ZIMMERMAN.